United States Patent Office 3,796,616
Patented Mar. 12, 1974

3,796,616
POROUS SUBSTRATE FOR FIBROUS GRAPHITE STRUCTURE PRODUCED BY ADDITION OF DEGRADABLE MATERIAL
Clarence E. Northway, Lake View Terrace, Calif., assignor to Haveg Industries, Inc., Wilmington, Del.
No Drawing. Filed May 23, 1972, Ser. No. 256,064
Int. Cl. B29c 25/00
U.S. Cl. 156—60                                    12 Claims

ABSTRACT OF THE DISCLOSURE

A fibrous graphite unit is made by taking plies of B-stage resin impregnated cloth of at least 80% carbon assay (carbon or graphite cloth) and stacking one on another to form a substrate unit. Degradable fibrous material is interposed between the plies. The resin is cured (C-stage) and the fibrous material is disintegrated thereafter at higher temperatures than the curing temperature leaving voids in its place in the unit and thus providing a porous substrate. The substrate, after at least being pyrolyzed, is infiltrated with pyrolytic carbon which is then converted to pyrolytic graphite.

---

Reinforced plastic composite units and massive graphite units have been the two basic material types capable of withstanding rocket nozzles and reentry environments. Each of these two types of materials have advantages and limitations but have been successfully developed on innumerable space and missile systems for thermal protection. The reinforced plastic composite unit is produced by taking plies of B-stage phenol-formaldehyde resin impregnated carbon or graphite cloth and laying the plies upon one another to form a unit, compressing the unit by a given pressure, and heating to cure (convert to C-stage) the phenol-formaldehyde resin while the unit is under the given pressure. This reinforced plastic composite exhibits typically high erosion rates and poor temperature strength retention as compared to massive graphites. However, their inherently high initial strength, low thermal conductivity, and good thermal shock resistance permit the fabrication of large complex shapes.

Massive graphite articles are those which are made by mixing a graphitizable furfuryl alcohol resin or pitch with graphite particles and either molding or extruding the same into a unit, curing or polymerizing the binder and then graphitizing the unit. This unit displays high erosion resistance rates and high temperature strength retention when compared to a reinforced plastic composite unit but also exhibits lower initial strength and poor thermal shock resistance which confines its use to small size and simple shapes.

Past attempts at combining the features of massive graphite units and reinforced plastic composites have been made by taking individual layers of B-stage phenol-formaldehyde resin impregnated carbon or graphite cloth and laying one on top of another to form a unit with the phenol-formaldehyde resin acting as a binder or matrix for holding the layers of cloth together.

The phenol-formaldehyde resin binder is then cured and afterwards, depending upon results desired, is either brought to a pyrolyzed, carbonized or graphitized condition resulting in a decrease in bulk density coupled with a corresponding increase in porosity to form a substrate unit which at either of these stages is between 10% and 20% porous by volume. The substrate is then redensified by filling the voids with phenol-formaldehyde resin, furfuryl alcohol or graphitizable pitch, all in liquid form. When phenolic resin or furfuryl alcohol is used, the impregnation takes place at room temperature and when pitch is used, impregnation takes place at a temperature where it is in a liquid state. The redensified substrate is then cured and then, depending upon desired properties, either pyrolyzed, carbonized or graphitized. This redensification cycle is repeated as many times as necessary to either completely fill the voids or partially fill the voids to give the resulting product a given density. Instead of the materials mentioned, the substrate can be redensified with pyrolytic graphite by introducing methane gas at approximately 1700° F.–2200° F. resulting in depositing pyrolytic carbon on the substrate and then graphitizing the pyrolytic carbon and/or unit, as the case may be, at about 5000° F. A well known method of this type of redensification is disclosed by Example 1 of U.S. Pat. No. 3,107,180 issued to Diefendorf. The use of pyrolytic carbon in this structure has the disadvantage of penetrating only from between 50 and 200 mils into the surface of the substrate since due to the compaction of the unit, the pore sizes are such that the pyrolytic carbon deposits close off the outer pores before penetrating deeply into the unit.

The fibrous graphite unit has shown increased erosion resistance over the reinforced plastic composite, but the continued development of high energy propulsion and more sophisticated maneuverable reentry systems have created a need for even better erosion resistance.

It is an object of this invention to provide a fibrous graphite structure which exhibits very high erosion resistance when compared to prior art structures.

It is a further object of this invention to employ a substrate which is very porous for impregnation of a substantial amount of pyrolytic carbon uniformly throughout the thickness of the substrate which is then converted to pyrolytic graphite and results in a product of substantial improvement over prior art products.

In employing the concept of this invention, a substrate unit is prepared having decomposable fibrous material distributed throughout the body thereof in a given pattern. This material may be in the form of a mesh netting or cloth having a portion thereof penetrating the outer surface of the unit or can be in the form of long fiber bundles with each bundle having at least one end thereof penetrating the outer surface thereof if the bundles are arranged in parallel relationship to each other. If one bundle intersects another bundle, it is only necessary that one end of one of the intersecting bundles penetrate the outer surface. One method of preparing the substrate is by taking B-stage resin impregnated plies of carbon or graphite cloth and stack one on top of another. During the stacking operation, the degradable fibrous material is placed in between certain plies and arranged in accordance with desired properties. Another method is by wrapping a continuous tape of B-stage resin impregnated carbon cloth or graphite cloth, in a manner as disclosed in either Trimble U.S. Pat. 3,402,085 or Trimble U.S. Pat. 3,402,091. The fibrous material may be fed from a separate spool simultaneously with the tape in a manner to be located between the impregnated plies or the fibrous material can be adhered to the tape prior to the tape being wound on a spool.

If carbon cloth is used, it must be of at least 80% carbon assay. The resin binders are of thermosetting materials, for example: phenol-formaldehyde resin, furfuryl alcohol, furfural and epoxylated novalac. It is well known in the reinforced plastics industry that these resins are capable of passing upon heating from an A-stage wherein the resin is liquid at ambient temperature to a B-stage condition wherein the resin is a thermoplastic solid or a partially gelled liquid of sufficient viscosity to behave as a thermoplastic solid and upon further heating is converted to a C-stage condition wherein the resin is a thermoset solid. Normally, the resin has been brought to the B-stage condition prior to stacking the impregnated cloth layers or winding the impregnated tape. If the resin is in A-stage when the impregnated cloth layers are stacked one upon another or when the impregnated tape is wound, the stacked or wound structure will be heated at atmospheric pressure in an oven at a temperature of from 165° F. to 250° F. for up to 72 hours to bring the resin to B-stage condition.

The B-stage resin is then cured (brought to C-stage) by placing the unit into a mold and raising the temperature in increments to a range of 275° F. to 350° F. over a period of 2 to 4 hours at a pressure between 15 p.s.i.g. and 10,000 p.s.i.g.

The substrate is then either pyrolyzed, carbonized or graphitized, depending upon desired results. The substrate unit is pyrolyzed by increasing the temperature to a maximum of between 750° F. and 800° F. over a period of 2 hours to 5 days and subjecting the unit to the maximum temperature for a period of from 2 to 20 hours; carbonized by increasing the temperature further to a maximum of either 1500° F. to 1800° F. or 3000° F. to 3200° F. over a further period of 2 hours to 5 days and subjecting the unit to this maximum temperature for a period of from 2 to 20 hours; and then graphitized by increasing the temperature further to a maximum of from about 4800° F. to 5400° F. quite rapidly (depending upon equipment used) and subjecting the unit to this maximum temperature from about 15 to 480 minutes. The degradable fibrous material may be chosen to disintegrate at any temperature above the resin curing temperature. Most of the time the material chosen will disintegrate during pyrolysis, although it could be chosen to disintegrate below pyrolysis temperatures or at carbonization or graphitization temperature. Examples of such degradable material are nylon, regenerated cellulose, cotton, cheese cloth, polyesters, etc. When the fibrous material disintegrates, voids will be left in their place in the same pattern. In the case of a mesh pattern or an intersecting fiber bundle pattern, the void pattern will comprise individual layers of a network of intersecting tunnels all of which will be accessible from the exterior of the substrate unit. In the case of parallel fiber bundles pattern, the void pattern will comprise individual layers of parallel tunnels which may pass entirely through or partially through the substrate unit but will have at least one end thereof at the exterior of the unit so that the interior of each tunnel will be accessible from the exterior of the substrate unit.

Porosity of the substrate unit is not only determined by the disintegration of the degradable fibrous material but also by the normal decomposition of the resin during pyrolysis and carbonization. The degree of porosity can be controlled by the percentage volume of degradable fibrous material in relation to the whole substrate unit. Obviously, the diameter of the fibrous material may vary and the fibrous volume per unit and the number and location of the plies between which the fibrous material is placed may vary, depending upon desired characteristics. In any of the pyrolyzed, carbonized or graphitized stages, the substrate can have an available volume porosity of up to 60% to be filled with pyrolytic carbon.

The porous substrate unit, made by any of the above methods, is then placed into a chamber and a vacuum pulled on the substrate to evacuate the voids and then the substrate is redensified by infiltrating with methane gas which deposits pyrolytic carbon in the substrate under vacuum at a temperature from about 1700° F. to 4200° F. A preferred temperature range for infiltration of this type of substrate is between 1700° F. and 2200° F. for a period of about 100 to 200 hours in order to provide a structure with maximum mechanical properties and resistance to thermal shock. This infiltration procedure is standard and can be described in Example 1 of Diefendorf U.S. Pat. No. 3,107,180. After the deposit of pyrolytic carbon, the unit is then usually baked at temperatures between 5000° F. and 5500° F. for a period of 15 to 480 minutes to graphitize the pyrolytic carbon and, if necessary, the binder portion of the unit and the carbon cloth portion. The redensifying procedure may be repeated as often as necessary to obtain the desired density prior to graphitizing the pyrolytic carbon. It should be realized that the time periods given for curing, pyrolyzing, and graphitizing are mainly dependent upon the size of the unit.

The use of degradable fibrous material may also be employed as an improvement to the oxidation treatment of a substrate unit as described in the patent application of C. E. Northway and R. L. Pegg, Ser. No. 256,069, filed May 23, 1972 now U.S. Pat. No. 3,758,352, entitled Porous Fibrous Substrate Structure Produced in Oxidizing Atmosphere (common assignee). Briefly, that application concerns treating a substrate unit in an oxidizing atmosphere at temperatures between 400° F. and 900° F. for a period long enough to effect sufficient degradation of the binder, resulting in a porous substrate unit. The degradable material is selected to degrade at a temperature either below the temperature utilized for the oxidation treatment or to degrade during the oxidation treatment. Not only will the degradation of the degradable fibrous material causes voids in the substrate unit, but the passages formed by the degradation will allow penetration of the oxidizing atmosphere further into the substrate unit and thus expose more area of the substrate unit to the oxidizing atmosphere to cause a higher porosity to occur.

The following examples illustrate the invention.

EXAMPLE 1

A state of the art control sample was prepared by stacking plies of B-stage phenol-formaldehyde resin impregnated graphite cloth on one another to form a unit and treating the same at 325° F. under 1000 p.s.i. for 1 hour. The density of the substrate unit at this stage was 88 lbs./ft.³. The substrate unit was carbonized by placing the same into a high temperature furnace, having an inert atmosphere, and heating slowly to 1500° F. over a period of 3 days. The carbonized substrate had a density of 71.6 lbs./ft.³. The carbonized substrate was then placed in a chamber and hydrogen diluted methane was introduced under vacuum at a temperature between 1800° F. and 2050° F. and allowed to infiltrate the substrate unit for 120 hours whereby pyrolytic carbon was deposited in the voids of the substrate. The density of the substrate containing the pyrolytic carbon was 75.5 lbs./ft.³ with the pyrolytic carbon representing approximately 4.7% of the total weight of the unit.

EXAMPLE 2

A panel substrate was made by taking individual B-stage phenol-formaldehyde resin impragnated graphite cloth plies and plies of nylon mesh and alternately laying one on top of another to form a unit. The nylon plies weighed approximately 8% of the weight of the total unit. The unit was placed in a mold and the resin was cured raising the temperature in increments to 300° F. over a period of 8 hours at a pressure of 1000 p.s.i. At this stage, the density of the unit was 85 lbs./ft.³ and the unit was less than 5% porous. The unit was removed from the mold and placed in an oven in inert atmosphere with the temperature being raised to 1500° F. over a period of 3 days to carbonize the unit and totally disintegrate the nylon mesh, resulting in a porous unit. The density of this porous unit was 60 lbs./ft.³ and the unit was about 37% porous.

EXAMPLE 3

A substrate was prepared by taking layers of phenol-formaldehyde resin impregnated graphite cloth and layers of unbleached cheese cloth made from 100% cotton fiber and alternately stacking one upon another so that each layer of cheese cloth was located between two layers of graphite cloth. The cheese cloth weighed approximately 7½% of the weight of the total unit. The resin impregnated graphite cloth was also carbon filled. This structure was compacted in a hydraulic press at 1000 p.s.i. and at 325° F. for 1 hour. The density of this structure at this stage was 85 lbs./ft.$^3$ and this unit was around 4.5 to 6.1% porous. The substrate was then placed into a high temperature oven and thermally degraded in an oxidizing atmosphere (containing approximately 20 to 21% of oxygen by volume) in accordance with the following schedule: 2 hours at 325° F., 2 hours at 425° F., 24 hours at 500° F., 48 hours at 550° F., 24 hours at 600° F., and 8 hours at 650° F. The treated unit was removed from the oven and found to have a density of 56.1 lbs./ft.$^3$.

The substrate was then placed into a high temperature furnace, having an inert atmosphere, and heated slowly to 1500° F. over a period of 3 days to carbonize the substrate. The carbonized unit had a density of 54 lbs./ft.$^3$ and was 40.1% porous.

The carbonized structure was then placed in a chamber and hydrogen diluted methane gas was introduced under vacuum at a temperature of approximately between 800° F. and 2050° F. and allowed to infiltrate the substrate unit for 240 hours whereby pyrolyzed carbon was deposited in the voids of the substrate. After the first infiltration, the density of the unit was increased to 86.6 lbs./ft.$^3$. The pyrolytic carbon comprised approximately 38% of the weight of the total unit. Subsequent infiltrations resulted in a unit having a density of 103 lbs./ft.$^3$ and the pyrolytic carbon comprised approximately 43% of the weight of the total unit.

EXAMPLE 4

A press molded panel was prepared by stacking on one another plies of B-stage phenol-formaldehyde resin impregnate graphite cloth to form a unit and treating the same at 325° F. under 1000 p.s.i. for 3 hours to cure the resin. The resin binder weighed about 35% of the total unit and a carbon filler weighed about 15% of the total unit. The density of the substrate at this stage was 87.2 lbs./ft.$^3$. This substrate unit was treated in an oxidizing atmosphere (17–21% oxygen by volume) for 84 hours at 600° F. Thereafter, the substrate was carbonized in an inert atmosphere in accordance with prior art procedures. The density of the treated substrate was 63 lbs./ft.$^3$ with a calculated porosity of between 30 and 34%. The density of the carbonized substrate was 59.2 lbs./ft.$^3$ with a calculated porosity of approximately 34%.

The conditions under which Example 4 was oxidized would normally yield a more porous substrate than a substrate oxidized under the conditions of Example 3. However, the utilization of a degradable fibrous material in Example 3 was responsible for that example being more porous than the unit of Example 4.

What I claim and desire to protect by Letters Patent is:
1. A process for making a porous substrate unit comprising:
  (a) stacking thermosetting resin binder impregnated plies of carbon or graphite cloth one on top of the other, to form a substrate unit while separating at least one pair of adjacent plies with a degradable fibrous material, said degradable fibrous material protruding from the outer surface defined by the plies of carbon or graphite cloth forming said substrate unit, said carbon or graphite cloth being of at least 80% carbon assay,
  (b) heating said substrate unit at conditions of temperature and pressure sufficient to effect cure of said thermosetting resin binder to a thermoset solid, and
  (c) heating the resulting substrate unit of step (b) at a temperature sufficient to disintegrate said degradable fibrous material thereby forming the voids within said substrate unit, said voids being accessible from the exterior of the substrate unit.

2. The process of claim 1 in which the thermosetting resin binder impregnated in said plies of carbon or graphite cloth is brought to B-stage prior to stacking of said plies.

3. The process of claim 1 in which each pair of adjacent plies of carbon or graphite cloth is separated with a layer of degradable fibrous material.

4. The process of claim 1 wherein the substrate unit of step (c) is pyrolyzed.

5. The process of claim 1 wherein the substrate unit of step (c) is carbonized.

6. The process of claim 1 wherein the substrate unit of step (c) is graphitized.

7. The process of claim 1 comprising the further step of infiltrating the substrate unit with pyrolytic carbon and depositing said pyrolytic carbon in the voids within said substrate unit.

8. The process as recited in claim 2 comprising the further step of infiltrating the substrate unit with pyrolytic carbon and depositing said pyrolytic carbon in the voids in said substrate unit.

9. The process of claim 7 further comprising graphitizing at least the pyrolytic carbon deposited in the substrate unit.

10. The process of claim 8 further comprising graphitizing at least the pyrolytic carbon deposited within the substrate unit.

11. The process of claim 2 in which the degradable fibrous material is in the form of mesh netting.

12. The process of claim 2 in which the degradable fibrous material is in the form of fiber bundles.

References Cited

UNITED STATES PATENTS

| | | | |
|---|---|---|---|
| 3,664,859 | 5/1972 | Beatty et al. | 117—46 CG |
| 3,416,944 | 12/1968 | Pirrung et al. | 117—46 CC |
| 3,682,595 | 8/1972 | Okuda et al. | 117—46 CC |

EDWARD G. WHITBY, Primary Examiner

U.S. Cl. X.R.

117—46 CC, 46 CG; 264—29